(12) United States Patent
Nelsen

(10) Patent No.: US 9,827,895 B2
(45) Date of Patent: Nov. 28, 2017

(54) MECHANICAL ARRANGEMENT AND A METHOD FOR A TRAILER

(71) Applicant: Angelo Engineering Pty Ltd, Erskine Park, New South Wales (AU)

(72) Inventor: Mark Ronald Nelsen, Erskine Park (AU)

(73) Assignee: Angelo Engineer PTY Ltd, Erskine Park, New South Wales (AU)

( * ) Notice: Subject to any disclaimer, the term of this patent is extended or adjusted under 35 U.S.C. 154(b) by 0 days.

(21) Appl. No.: 15/312,770

(22) PCT Filed: May 14, 2015

(86) PCT No.: PCT/AU2015/000282
§ 371 (c)(1),
(2) Date: Nov. 21, 2016

(87) PCT Pub. No.: WO2015/176102
PCT Pub. Date: Nov. 26, 2015

(65) Prior Publication Data
US 2017/0136935 A1   May 18, 2017

(30) Foreign Application Priority Data
May 21, 2014  (AU) ................................ 2014901893

(51) Int. Cl.
*B60P 3/335*  (2006.01)
*B60P 3/34*   (2006.01)

(52) U.S. Cl.
CPC .................................. *B60P 3/341* (2013.01)

(58) Field of Classification Search
CPC .................................. B60P 3/34; B60P 3/341
(Continued)

(56) References Cited

U.S. PATENT DOCUMENTS 2,549,266 A * 4/1951 Troden ................... B60P 3/341
                                                        172/499
3,006,353 A   10/1961 Richardson
(Continued)

FOREIGN PATENT DOCUMENTS

AU   1989/040822 C   3/1990
AU   2005101058 B4   2/2006
(Continued)

OTHER PUBLICATIONS

English (Machine) Translation of CN203345080.
(Continued)

*Primary Examiner* — Dennis H Pedder
(74) *Attorney, Agent, or Firm* — Thomas M. Joseph, Esq.

(57) ABSTRACT

A mechanical arrangement for a trailer, the mechanical arrangement comprising a surface portion, the mechanical arrangement being configurable in either: a stowed configuration wherein the surface portion is located on top of the trailer; or a deployed configuration wherein the surface portion lies adjacent to the ground; the mechanical arrangement further comprising: a telescopic height adjuster configurable in either: a stowed position when the mechanical arrangement is in the stowed configuration; or a deployed position when the mechanical arrangement is in the deployed configuration.

20 Claims, 18 Drawing Sheets

(58) Field of Classification Search
USPC .............................................. 296/161, 26.11
See application file for complete search history.

(56) References Cited

U.S. PATENT DOCUMENTS

| | | | | |
|---|---|---|---|---|
| 3,489,452 | A | * | 1/1970 | Plante ..................... B60P 3/341 135/116 |
| 3,604,747 | A | * | 9/1971 | Gorman ................ B60P 3/1041 135/116 |
| 3,703,311 | A | * | 11/1972 | Davis ..................... B60P 3/341 135/116 |
| 4,088,363 | A | * | 5/1978 | Palmer .................... B60P 3/341 135/116 |
| 4,250,906 | A | * | 2/1981 | Rivier .................... B60P 3/341 135/150 |
| 2003/0184055 | A1 | | 10/2003 | Badger et al. |

FOREIGN PATENT DOCUMENTS

| | | |
|---|---|---|
| AU | 2007100994 A4 | 11/2007 |
| CA | 2317952 C | 2/2002 |
| CA | 2512966 A1 | 2/2002 |
| CN | 203345080 U | 12/2013 |
| DE | 2841550 A1 | 4/1979 |
| EP | 0028195 A1 | 5/1981 |
| GB | 995973 A | 6/1965 |
| JP | H09-220964 A | 8/1997 |
| WO | WO02/032752 A1 | 4/2002 |
| WO | WO2006/050387 A2 | 5/2006 |
| WO | WO2007/042042 A1 | 4/2007 |

OTHER PUBLICATIONS

English (Machine) Translation of DE2841550.
English (Machine) Translation of EP0028195.
English (Machine) Translation of JPH09-220964.

* cited by examiner

MECHANICAL ARRANGEMENT AND A METHOD FOR A TRAILER

CROSS REFERENCE TO RELATED APPLICATIONS

The present application is a U.S. national stage application of PCT International Application No. PCT/AU 2015/000282, filed May 14, 2015, and published as PCT Publication WO 2015/176102 on Nov. 26, 2015, which claims priority to Australian Application No. AU 2014901893, filed on May 21, 2014 .The disclosures of all the foregoing applications are hereby incorporated by reference in their entirety into the present application.

FIELD OF THE INVENTION

The present invention relates to trailers and in particular to a camping trailer.

The invention has been developed primarily for use in and/or with trailers and will be described hereinafter with reference to this application. However, it will be appreciated that the invention is not limited to this particular field of use.

BACKGROUND OF THE INVENTION

A travel trailer is typically towed behind a road vehicle that provides a place to rest that offers greater comfort and protection than a tent. It provides the means for people to have their own home on a journey or a vacation, without relying on a motel or hotel, and enables them to stay in places where none is available. A common type of travel trailer is a tent trailer that can be easily deployed and collapsed for easy storage and transport. This type of trailer provides a large amount of interior space relative to the size when collapsed. With the relatively affordable price, tent trailers have proven to be a popular choice in the market. However, in light of the attractive advantages offered by conventional tent trailers, tent trailers in the collapsed or stowed configuration are typically at an elevated position that forms an unstable platform for the transportation of vehicles or people. Furthermore, standard trailers have the added process requirement of adding extra poles/rods to structurally support the canvas after the tent has been deployed from the trailer. However, many standard campers when erected either have a pole crossing the doorway or the size of the door is reduced to hide or compensate this issue.

It is to be understood that, if any prior art information is referred to herein, such reference does not constitute an admission that the information forms part of the common general knowledge in the art, in Australia or any other country.

SUMMARY OF THE INVENTION

The invention seeks to provide a system and method for tent trailers, which will overcome or substantially ameliorate at least some of the deficiencies of the prior art, or to at least provide an alternative.

According to a first aspect of the present invention, there is provided a mechanical arrangement for a trailer. The mechanical arrangement may comprise a surface portion. The mechanical arrangement may be configurable in either: a stowed configuration wherein the surface portion is located on top of the trailer; or a deployed configuration wherein the surface portion lies adjacent to the ground. The mechanical arrangement may further comprise a telescopic height adjuster. The telescopic height adjuster may be configurable in either: a stowed configuration when the mechanical arrangement is in the stowed configuration; or a deployed configuration when the mechanical arrangement is in the deployed configuration.

According to a particular embodiment of the first aspect, there is provided a mechanical arrangement for a trailer, the mechanical arrangement comprising a surface portion, the mechanical arrangement being configurable in either: a stowed configuration wherein the surface portion is located on top of the trailer; or a deployed configuration wherein the surface portion lies adjacent to the ground; the mechanical arrangement further comprising: a telescopic height adjuster configurable in either: a stowed configuration when the mechanical arrangement is in the stowed configuration; or a deployed configuration when the mechanical arrangement is in the deployed configuration.

The mechanical arrangement may further comprise a torsion member adapted to apply resistive torque to the surface portion in rotation about a pivot point. The mechanical arrangement may further comprise a mechanical link having a terminating portion. The terminating portion may be adapted to be substantially horizontally disposed when the mechanical arrangement is in the deployed configuration. In use, the mechanical arrangement may be adapted for allowing the surface portion to be pivoted between the stowed and the deployed configurations.

The torsion member may comprise an elongated member mechanically coupled to the height adjuster and the trailer. In use, the elongated member may be extendible along an elongation axis.

The mechanical arrangement may further comprise an actuating means operably coupled to the torsion member. In use, the actuating means may allow for linear displacement of the elongated member along the elongation axis.

The height adjuster may be adapted to allow for linear displacement of a length approximately equal to a length from the pivot point to the ground.

The height adjuster may further comprise an internal supporting elongated member configured inside the height adjuster. In use, the internal supporting elongated member may be extendible along an elongated axis to provide rigidity to the height adjuster.

The internal supporting elongated member may be a strut.

The height adjuster may further comprise a lockable means for maintaining the length of the internal supporting elongated member in use. The lockable means may be activated by rotating the height adjuster in the deployed configuration about the pivot point. In use, the lockable means may be activated by a user adjustable handle.

The mechanical arrangement may be adapted for supporting a tent. The pivoting of the surface portion between the stowed and the deployed configurations may be adapted to erect the tent.

The trailer may be a tent trailer.

According to a second aspect of the invention, there is provided a tent trailer. The tent trailer may comprise a surface portion. The tent trailer may be configurable in either: a stowed configuration wherein the surface portion is located on top of the trailer; or a deployed configuration wherein the surface portion lies adjacent to the ground. The surface portion may be pivotable about a pivot point between the stowed and the deployed configurations thereby to erect the tent. The tent trailer may further comprise a telescopic height adjuster configurable in either: a stowed configuration when the trailer is in the stowed configuration; or a deployed configuration when the trailer is in the deployed configuration. The tent trailer may further comprise a torsion member adapted apply resistive torque to the surface portion in rotation about the pivot point. The tent trailer may further comprise a mechanical link having a terminating portion. The terminating portion may be adapted to be substantially horizontally disposed and adapted to support the tent when the tent trailer is in the deployed configuration.

According to a particular embodiment of the second aspect, there is provided a tent trailer comprising a surface portion, the tent trailer configurable in either: a stowed configuration wherein the surface portion is located on top of the trailer; or a deployed configuration wherein the surface portion lies adjacent to the ground; the surface portion being pivotable about a pivot point between the stowed and the deployed configurations thereby to erect the tent; the tent trailer further comprising: a telescopic height adjuster configurable in either: a stowed configuration when the trailer is in the stowed configuration; or a deployed configuration when the trailer is in the deployed configuration; a torsion member adapted apply resistive torque to the surface portion in rotation about the pivot point; a mechanical link having a terminating portion, wherein the terminating portion is adapted to be substantially horizontally disposed and adapted to support the tent when the tent trailer is in the deployed configuration.

According to a third aspect of the present invention, there is provided a mechanical arrangement for a trailer. The trailer may comprise a surface portion. In use, the mechanical arrangement may be adapted for allowing the surface portion to be pivoted. The trailer may further comprise a height adjuster. The height adjuster may be configurable to a deployed configuration wherein the surface portion lies adjacent to the ground.

According to a particular embodiment of the third aspect, there is provided a mechanical arrangement for a trailer comprising a surface portion, wherein in use, the mechanical arrangement is adapted for allowing the surface portion to be pivoted about a pivot point and comprises a height adjuster configurable to a deployed configuration wherein the surface portion lies adjacent to the ground.

The height adjuster may be further configurable in a stowed configuration wherein the surface portion is located on top of the trailer.

In this manner, the mechanical arrangement allows the tent trailer to be collapsed to a stowed configuration wherein the height of the tent trailer in the stowed configuration may be sufficiently low so as to provide a stable platform having a low centre of gravity to additionally facilitate the loading/unloading and transportation of objects and recreational lightweight vehicles safely. The objects or recreational vehicles may be loaded onto the upper surface of the surface portion when in the stowed configuration.

The height adjuster may be adjusted, thus allowing the tent trailer to be collapsed in the stowed configuration with a sufficiently low height.

The mechanical arrangement may further comprise a torsion member. The torsion member may be configurable to apply resistive torque to the surface portion in rotation about the pivot point.

Advantageously, the torsion member allows resistive torque to be applied to the surface portion in rotation about the pivot point for placement into either a deployed or a stowed configuration for the safety of nearby persons during the deployment/storage process.

The torsion member may further comprise an elongated member mechanically coupled to the height adjuster and the trailer. In use, the elongated member may be extendible along an elongated axis. The elongated member may allow the torsion member to be extendible in length.

The mechanical arrangement may further comprise an actuating means operably coupled to the torsion member. In use, the actuating means allows for linear displacement of the elongated member along its elongation axis.

The actuating means may allow for the automated deployment and storage of the tent on the trailer.

The height adjuster may be telescopic, and may be further adapted to allow for linear displacement of a length approximately equal to a length from the pivot point to the ground.

The length of the height adjuster may be either: increased to elevate the height of the tent trailer; or decreased to lower the height of the tent trailer for the loading/unloading and transportation of lightweight vehicles in accordance with requirements.

The height adjuster may further comprise an internal supporting elongated member configured inside the height adjuster. In use, the internal supporting elongated member may be extendible along its elongation axis to provide rigidity to the height adjuster.

The internal supporting elongated member may provide rigidity to the height adjuster.

The internal supporting elongated member may be a strut.

The height adjuster may further comprise a lockable means for maintaining the length of the internal supporting elongated member in use.

Advantageously, the length of the height adjuster can be maintained.

The lockable means, may be activated by rotating the height adjuster about the pivot point whist the mechanical arrangement is in the deployed configuration.

The length of the height adjuster may be automatically locked whilst the mechanical arrangement is in the deployed configuration.

In use, the lockable means may be activated by a user adjustable handle.

The length of the height adjuster may be locked manually in the deployed configuration.

Preferably, the surface portion comprises a gripping means for lightweight vehicles.

According to a fourth aspect of the present invention, there is provided a mechanical support arrangement located on a trailer for supporting a tent. The mechanical support arrangement may comprise a mechanical link having a terminating portion. The mechanical support arrangement may be configurable into a deployed configuration in which the terminating portion of the mechanical support arrangement may be maintained in a substantially horizontally disposition.

According to a particular embodiment of the fourth aspect, there is provided mechanical support arrangement located on a trailer for supporting a tent. The mechanical support arrangement may comprise a mechanical link having a terminating portion. The mechanical support arrangement may be configurable into a deployed configuration in which the terminating portion of the mechanical support arrangement may be maintained in a substantially horizontally disposition.

According to a fifth aspect of the present invention, there is provided a mechanical support arrangement located on a trailer for supporting a tent. The mechanical support arrangement may comprise a mechanical link having a terminating portion. The mechanical support arrangement may be configurable into a deployed configuration in which the terminating portion is substantially horizontally disposed.

According to a particular embodiment of the fifth aspect of the present invention, there is provided a mechanical support arrangement located on a trailer for supporting a tent comprising a mechanical link having a terminating portion, the mechanical support arrangement being configurable into a deployed configuration in which the terminating portion may be substantially horizontally disposed.

In this manner, the mechanical arrangement allows the tent to be supported with Increased spacing while providing an unobstructed doorway without additional structural support.

The mechanical link may further comprise a horizontal terminating link pivoted against a first portion of the mechanical link, The mechanical arrangement may comprise a first portion of the mechanical link and a horizontal terminating link, wherein the horizontal terminating link is pivoted against the first portion of the mechanical link.

Advantageously, the mechanical link can be stowed and deployed to provide structural support for the tent.

The horizontal terminating link may be further adapted to support the tent, hereby to to maintain stability in the deployed configuration.

The tent, when in the deployed configuration may have greater resistance to wind.

The mechanical arrangement may be further adapted to the tent such that the tent is adapted to attach to the mechanical arrangement at all times.

The tent may be deployed or stored together with the mechanical arrangement.

The mechanical arrangement may be configured to the tent such that the tent overlays the mechanical arrangement when in the deployed configuration.

The tent overlay may be supported by the mechanical arrangement.

According to a sixth aspect of the invention, there is provided a method for configuring a surface portion of a trailer. The trailer may comprise a surface portion. The surface portion may be configurable in either: a stowed configuration wherein the surface portion is located on top of the trailer; or a deployed configuration wherein the surface portion lies adjacent to the ground. The method may comprise the step of adjusting the height of the surface portion by configuring a telescopic height adjuster to a deployed configuration, wherein in the deployed configuration of the height adjuster, the surface portion is in the deployed configuration and lies adjacent to the ground.

According to a seventh aspect of the invention, there is provided a method for configuring a surface portion of a trailer. The method may comprise the step of adjusting the height of the surface portion by configuring a height adjuster to a deployed configuration, wherein in the deployed configuration of the height adjuster, the surface portion lies adjacent to the ground.

According to a particular embodiment of the seventh aspect, there is provided a method for configuring a surface portion of a trailer comprising the step of adjusting the height of the surface portion by configuring a height adjuster to a deployed configuration, wherein in the deployed configuration of the height adjuster, the surface portion lies adjacent to the ground. The method may comprise the step of adjusting the height of the surface portion via rotation of the surface portion about a pivot point.

The method may further comprise the step of configuring the height adjuster in a stowed configuration where the surface portion is on top of the trailer.

The method may further comprise the step of applying resistive torque to the surface portion in rotation about the pivot point with a torsion member.

The method may further comprise the step of extending an elongated member along an elongated axis, where the elongated member is mechanically coupled to the height adjuster and the trailer.

The method may further comprise the step of linearly displacing the elongated member along the elongated axis using an actuating means operably coupled to the torsion member. The method may further comprise the step of orienting a planar member at an incline from the ground to the surface portion.

The method may further comprise the step of linearly displacing the telescopic height adjuster to a length substantially equal to a length from the pivot point to the ground.

The method may further comprise extending an internal supporting elongated member along an elongated axis, where the internal supporting elongated member may be configured inside the height adjuster to provide rigidity to the height adjuster.

The internal supporting elongated member may be a strut.

The method may further comprise the step of locking the length of the internal supporting elongated member using a lockable means.

The method may further comprise the step of rotating the height adjuster in the deployed configuration about the pivot point to activate the lockable means.

The method may further comprise the step of adjusting a user adjustable handle to activate the lockable means.

According to an eighth aspect of the invention, there is provided a method for providing structural support located from a trailer. The method may comprise the step of configuring a mechanical link having a terminating portion to a deployed configuration, such that in the deployed configuration, the terminating portion is substantially horizontally disposed.

According to a particular embodiment of the eighth aspect, there is provided a method for providing structural support located from a trailer, comprising the step of configuring a mechanical link having a terminating portion to a deployed configuration, such that in the deployed configuration, the terminating portion is substantially horizontally disposed.

The method may further comprise the step of pivoting a horizontal terminating link against a first portion of the mechanical link.

The method may further comprise the step of configuring the horizontal terminating link in a stowed configuration where the horizontal terminating link is substantially parallel to the first portion of the mechanical link.

The method may further comprise the step of adapting the horizontal terminating link to the tent to maintain stability in the deployed configuration.

The method may further comprise the step of overlaying the mechanical link with the tent in the deployed configuration.

The method of any one of the sixth to eighth aspects, may further comprise the step of configuring a mechanical link having a terminating portion to a deployed configuration when the surface portion is in the deployed configuration, wherein in the deployed configuration the terminating portion is substantially horizontally disposed.

The method of any one of the sixth to eighth aspects, may further comprise the step of pivoting a horizontal terminating link against a first portion of the mechanical link.

The method of any one of the sixth to eighth aspects, may further comprise the step of configuring the horizontal terminating link in a stowed configuration wherein the horizontal terminating link is substantially parallel to the first portion of the mechanical link.

The method of any one of the sixth to eighth aspects, may further comprise the step of adapting the horizontal terminating link to the tent to maintain stability in the deployed configuration.

The method of any one of the sixth to eighth aspects, may further comprise the step of overlaying the mechanical link with the tent in the deployed configuration.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DESCRIPTION OF EMBODIMENTS

Figure 1:
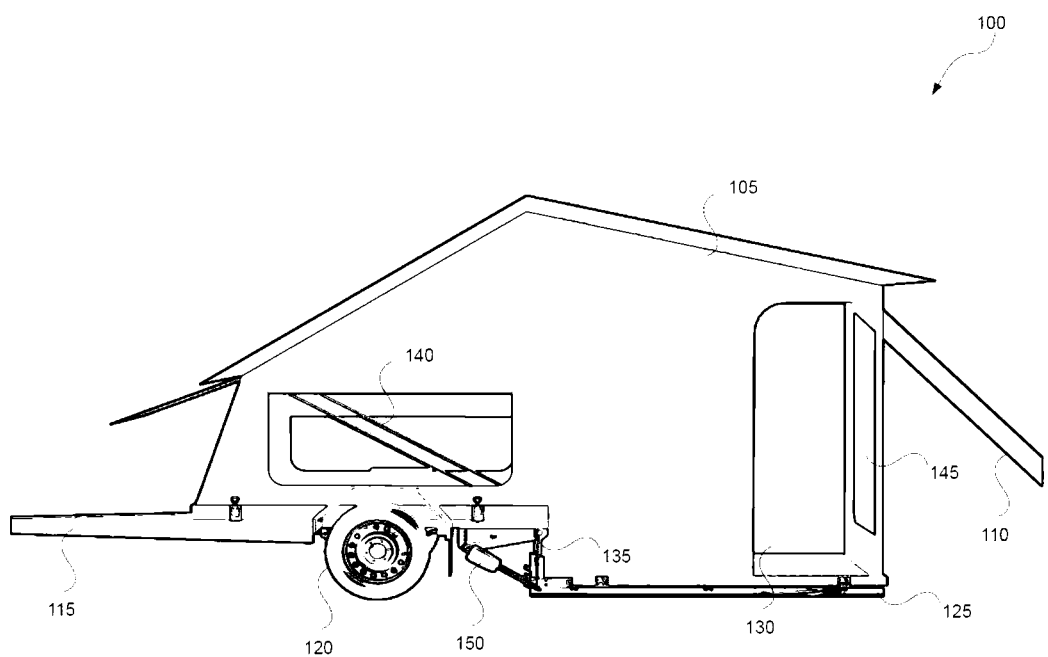
FIG. 1 shows an exemplary tent trailer in a fully deployed configuration in accordance with a preferred embodiment of the present invention.

It should be noted in the following description that like or the same reference numerals in different embodiments denote the same or similar features.

System Description

FIG. 1 shows an example tent trailer 100 on which the various embodiments and arrangements described herein may be used.

As will be described in further details below, the example tent trailer 100 is towed by an arbitrary vehicle (not shown) via a two wheeled 120 trailer 115. In the deployed configuration, the tent is erected by internal supporting members 140 that are overlayed with suitable tent material 105 such as canvas to provide shelter in the normal manner for a tent. The tent also provides suitable openings such as a door 130 and a window 145 protected by a window flap 110. In this example tent trailer 100, the top of the trailer 115 comprises a surface portion which, in the deployed configuration, unfolds to become the partial floor 125 of the tent in deployment, where the surface portion on top of the trailer rotatably pivots about the pivot point 135 with the supporting torque member 150 providing a resistive torque to dampen the pivoting deployment process.

Even though two wheel trailer 120 has been illustrated in the preferred embodiment, in general any type of trailer can be used in alternative embodiments that can support the deployment and stow of the tent trailer 100.

Storage

Figure 2:
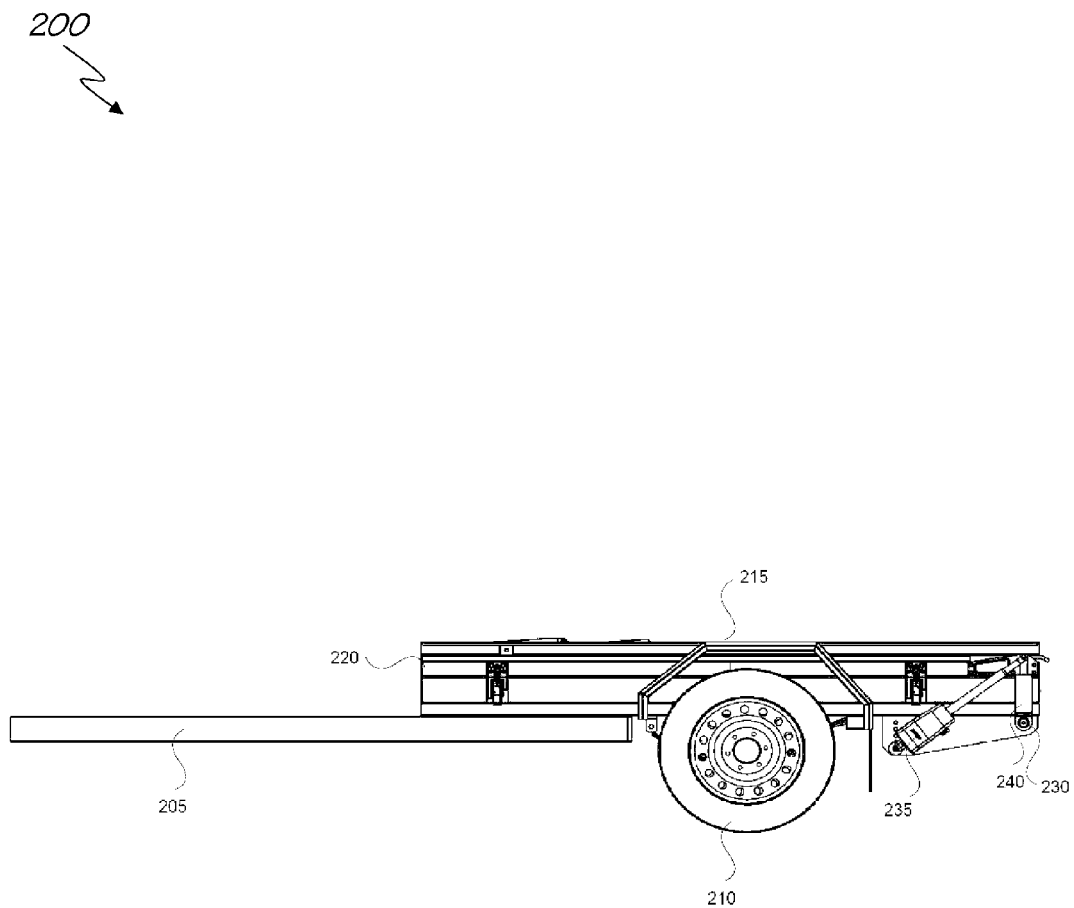
FIG. 2 shows an exemplary tent trailer in a fully stowed configuration in accordance with another preferred embodiment of the present invention.
Figure 3:
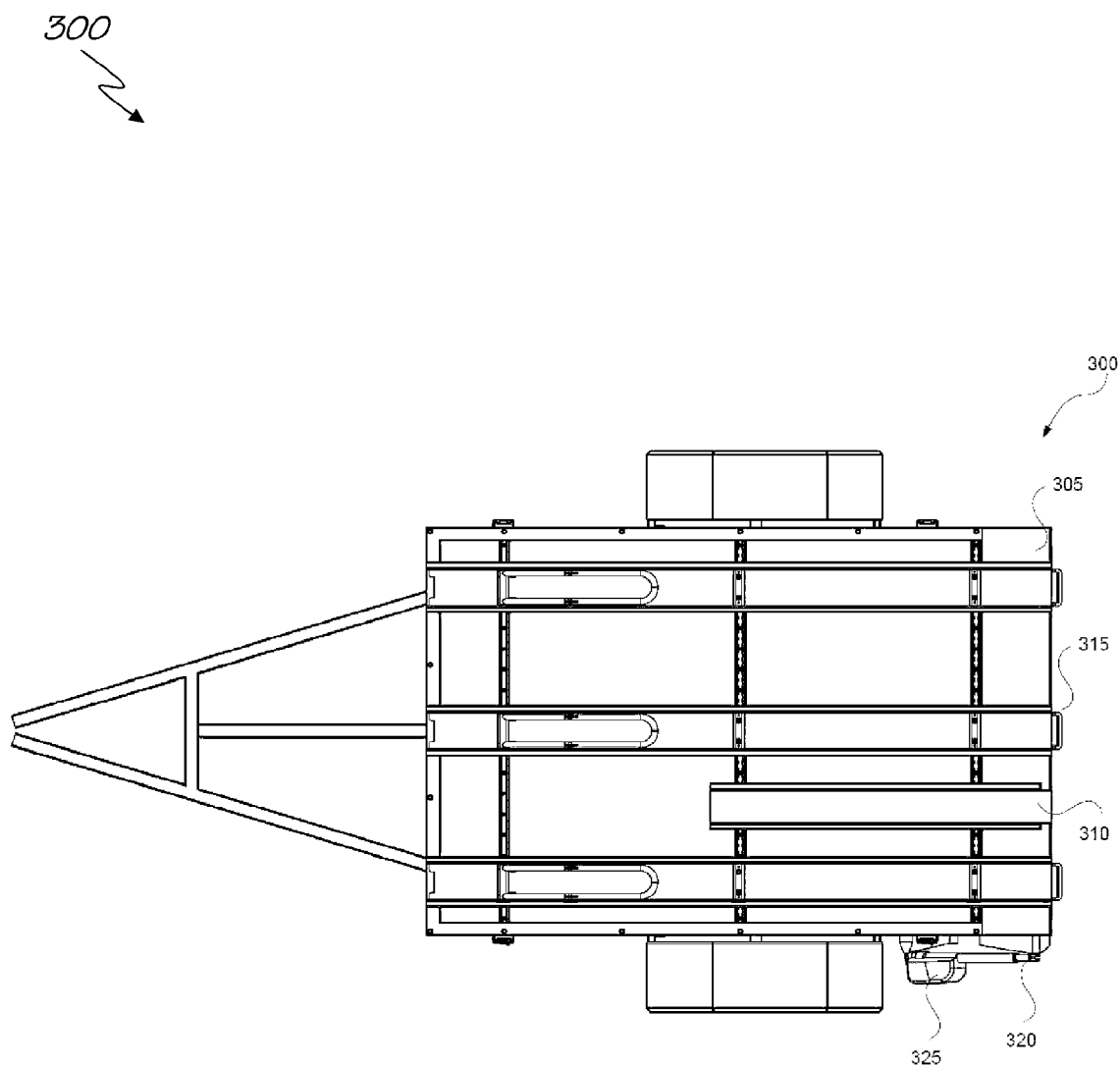
FIG. 3 shows a bird eye view of the exemplary tent trailer in the fully stowed configuration in accordance with another preferred embodiment of the present invention.

FIG. 2 shows an example tent trailer 200 in a stowed configuration where the tent is collapsed for storage and transport on a two wheeled 210 trailer 205. Here, the height adjuster 240 is in the retracted or shortened position where the height adjuster 240 is connected between the pivot point 230 of the trailer 205 and a point on the surface portion 220 on the top 215 of trailer 200. A torsion member 235 is connected on the same plane as the pivot point 230 and the opposing end of the height adjuster 240 such that in the deployment of the surface portion 220 about the pivot point 230, a resistive torque can be applied to smooth out the deployment process of the surface portion 220. In a particular embodiment, where the deployment and storage configuration of the tent trailer is to be performed automatically, the length of the torsion member 235 can be extended by means of an actuator such that extending the length of the torsion member 235 causes linear displacement of the height adjuster 230 along the elongated axis as a force along the elongated axis component may be applied. In general, the applicable actuators may be one of either, are not limited to, screw jack, pneumatic, hydraulic cylinders, electric, mechanical and manual actuators, or suitable combinations thereof as would be appreciated by the skilled addressee. The surface portion 220 on the top of the trailer 205 includes suitable railings, bars for tying down objects and recreational vehicles. As an example, FIG. 3 shows a bird-eye view of an example embodiment of suitable railings, bars 315 and an incline platform 310 of the top surface 305 of the trailer 300. The railings, bars 315 would be in a suitable configuration so that lightweight recreational vehicles, for example, but not limited to, bicycles, motorbikes and dune buggies can be attached securely for transport on a trailer 300. The incline platform 310 is adapted to be pivoted about the edge of the top surface 305 of the trailer such that in the deployment configuration, the flat supporting surface of the incline platform 310 can be tilted at an angle, with one end higher than the other to raise or lower a load onto the top surface of the trailer 305. The height adjuster here is shown as 320 connected to the torsion member 325.

Even though a set of height adjuster 320 and torsion member 325 has been shown on the left side of the tent trailer 300, in other embodiments, another set of height adjuster and torsion member may also be installed to tent trailers providing greater deployment/storage support.

Figure 4:
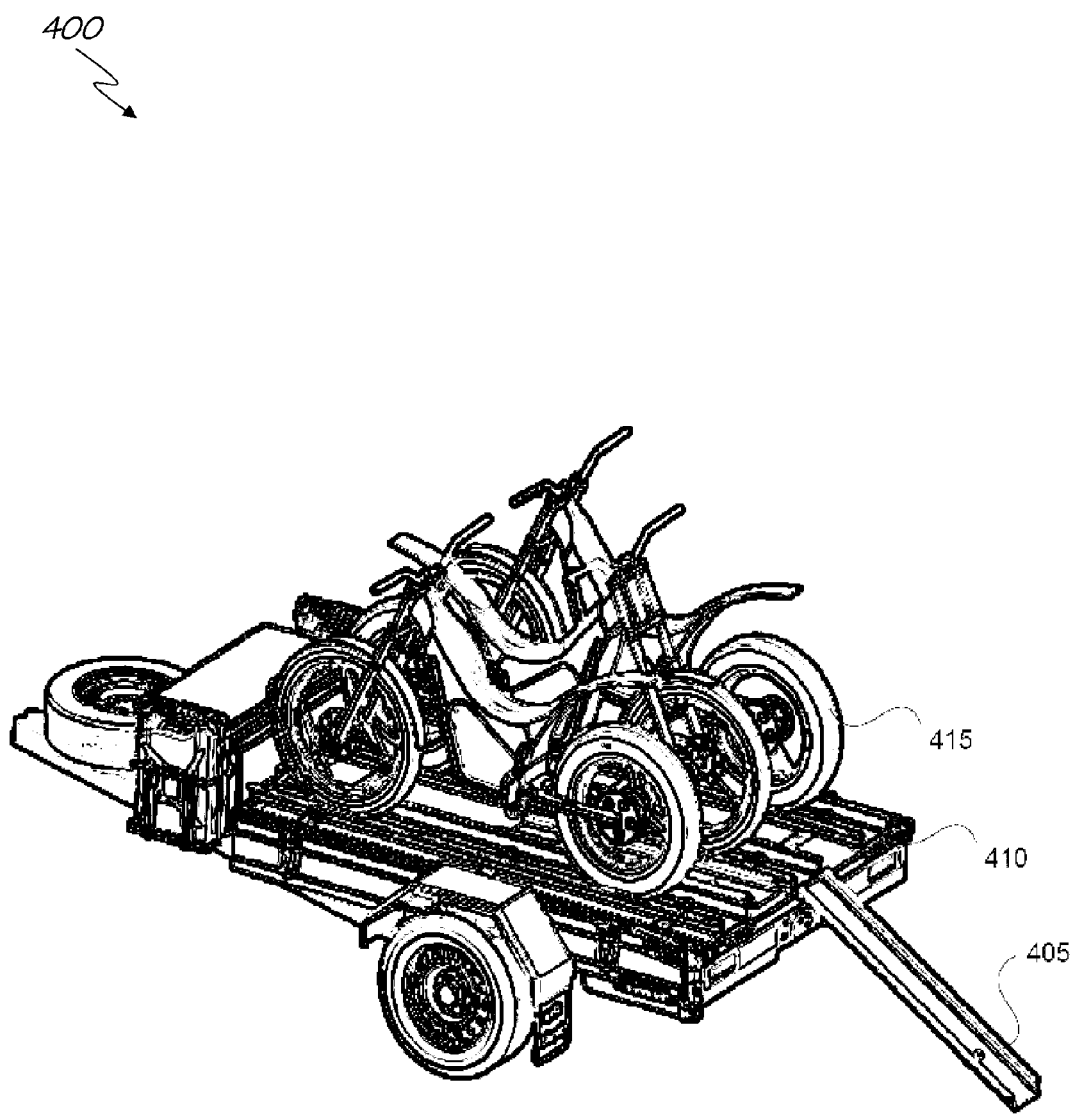
FIG. 4 shows a perspective view of the exemplary tent trailer in the fully stowed configuration in accordance with another preferred embodiment of the present invention.

By means of non-limiting example, FIG. 4 shows the trailer 400 in stowed configuration in the perspective view where the railings and bars 410 on the top surface of the trailer 400 are arranged for the spacing and securely fastening three bicycles 415 for transportation by the trailer 400. The incline platform 405 in the deployed configuration is also shown and in general is pivoted against the edge of the trailer 400 with a length greater than the height of the trailer 400 as measured from the top surface of the trailer 400 to the ground. It can be understood by a person skilled in the art that any suitable arrangement of the railing, bars 410 is possible and the realistic design of the arrangement depends on the application of use. Alternatives to railings are not limited to guides, chocks, stops and tie down points that effectively prevent unnecessary movement during transportation.

To minimise weight, the tent trailer 400 may be manufactured with light robust alloys with physical characteristics suitable for applications under practical cost constraints.

Deployment

Figure 5:
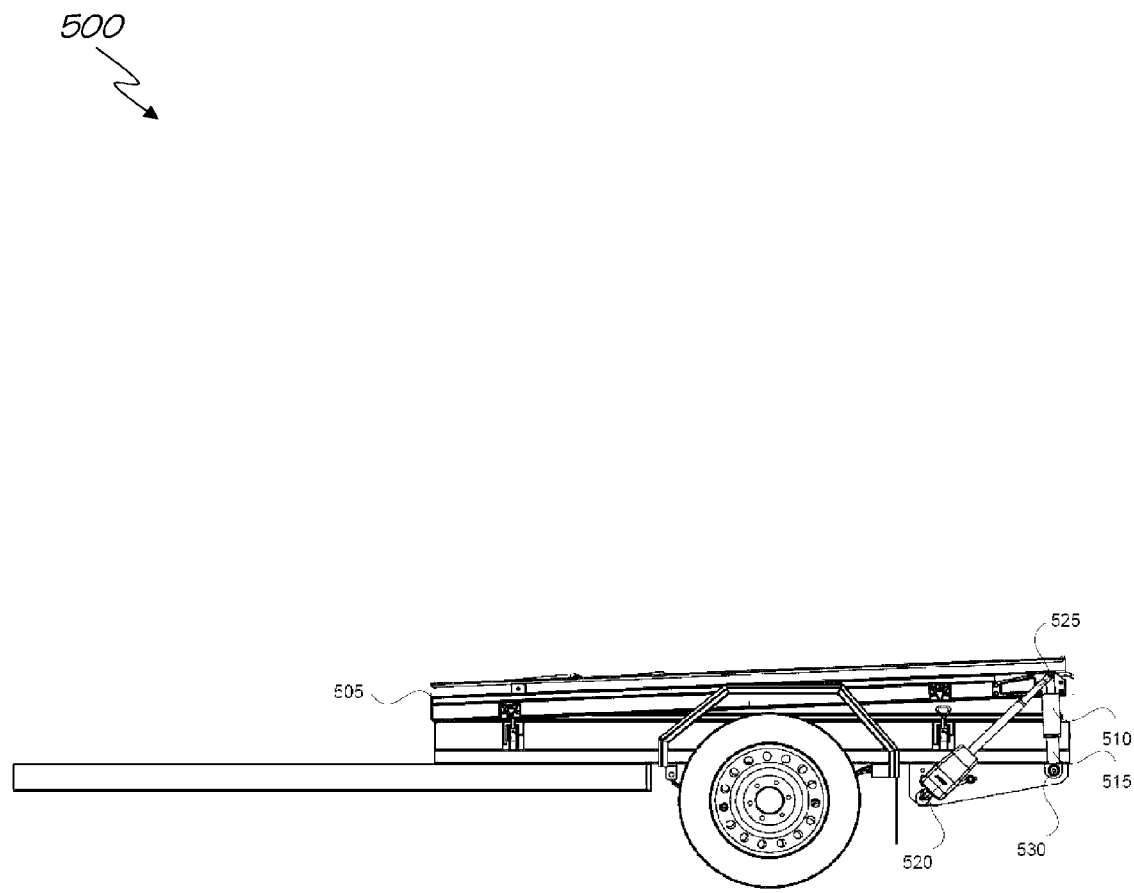
FIG. 5 shows an exemplary tent trailer in the initial steps of the deployment phase in accordance with another preferred embodiment of the present invention.

In the initial phase of deploying the trailer 500 as shown in FIG. 5, the length of the telescopic height adjuster 510 is increased revealing a portion of the height adjuster 515 previously not shown. As the height adjuster 515 connects between the pivot point 530 and the surface portion 505 of the trailer 500, extending the length of the height adjuster 515 to a length substantially equal to the length from the pivot point 530 to the ground, elevates the height of the pivot end of the trailer 500. As will be described in further details below, the length of the height adjuster can be extended in a variety of ways. In this particular embodiment 500, the length of the height adjuster 510 is extended by the extended length of the supporting portion member 520 with the extension of the elongated member 525 mechanically coupled to the height adjuster 510. In alternative embodiments, the length of the height adjuster 510 can be extended by actuating means that is directly attached to the height adjuster 510.

Figure 6:
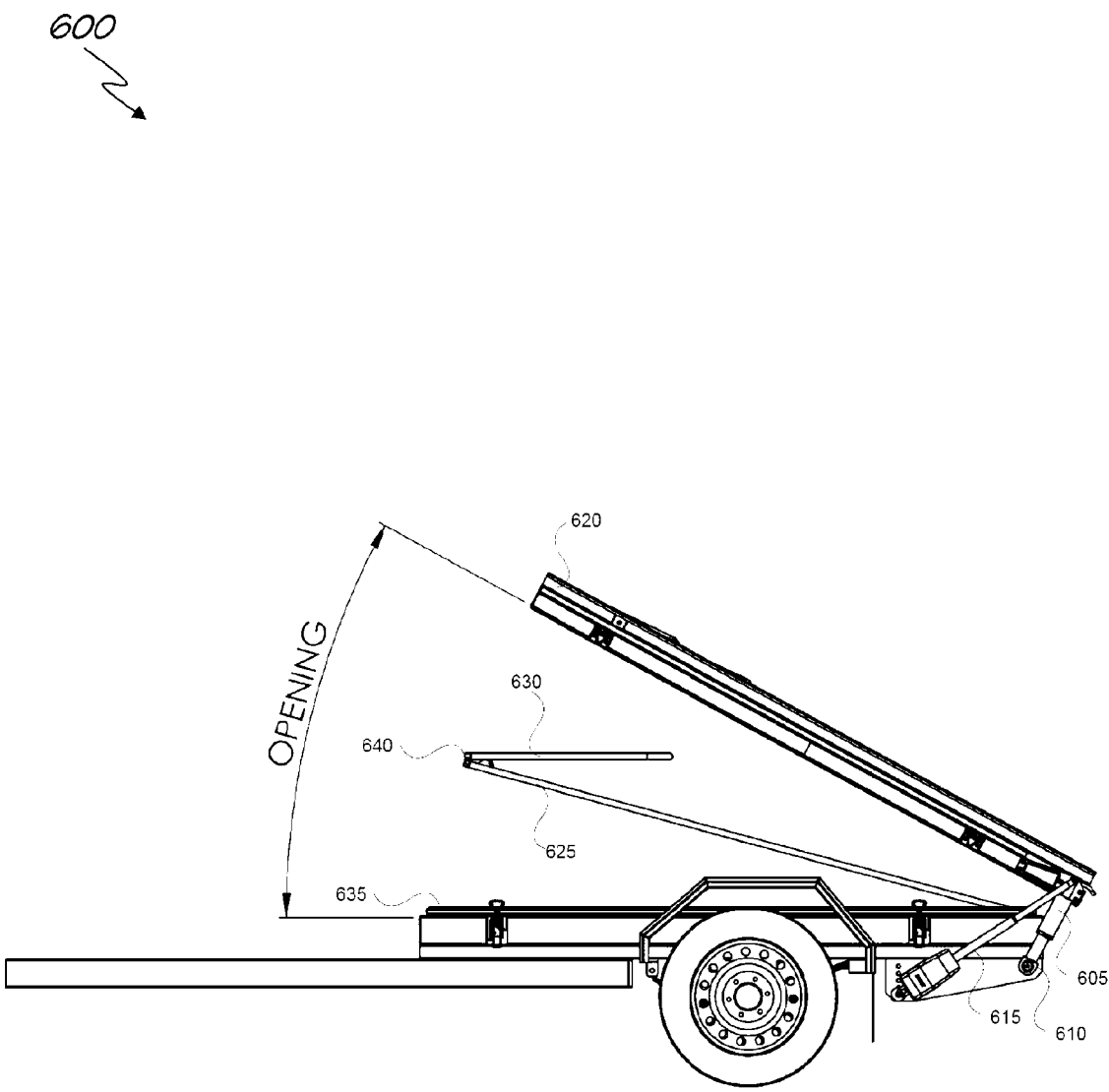
FIG. 6 shows an exemplary tent trailer in the intermediary steps of the deployment phase in accordance with another preferred embodiment of the present invention.

In the intermediate steps of the deployment process of the trailer 600 as shown in FIG. 6, the length of the height adjuster 605 is fixed or locked in place by lockable means that will be described in details later, and the surface portion 620 is rotatably pivoted about the pivot point 610 of the trailer 600 in a clockwise manner effectively opening up or deploying the tent trailer 600.

In this particular embodiment, beneath the surface portion 620 of the trailer 600 are various members in stowed configurations that would otherwise form the necessary structural support to the tent during deployment. The members evident in FIG. 6 that provide tent structural support are shown as a mechanical link 640 and a vertical member 635 in a storage position inside the trailer 600. The mechanical link 640 further includes the horizontal terminating link 630 hinged against a first portion of the mechanical link 625. In this embodiment, the tent overlay is attached to the structural support and therefore the structural support would be masked out by the tent overlay. For clarity in illustration, the tent overlay is not shown with the structural support members in 600. In alternative embodiments, the tent overlay may be attached onto the structural support members post deployment.

Figure 7:
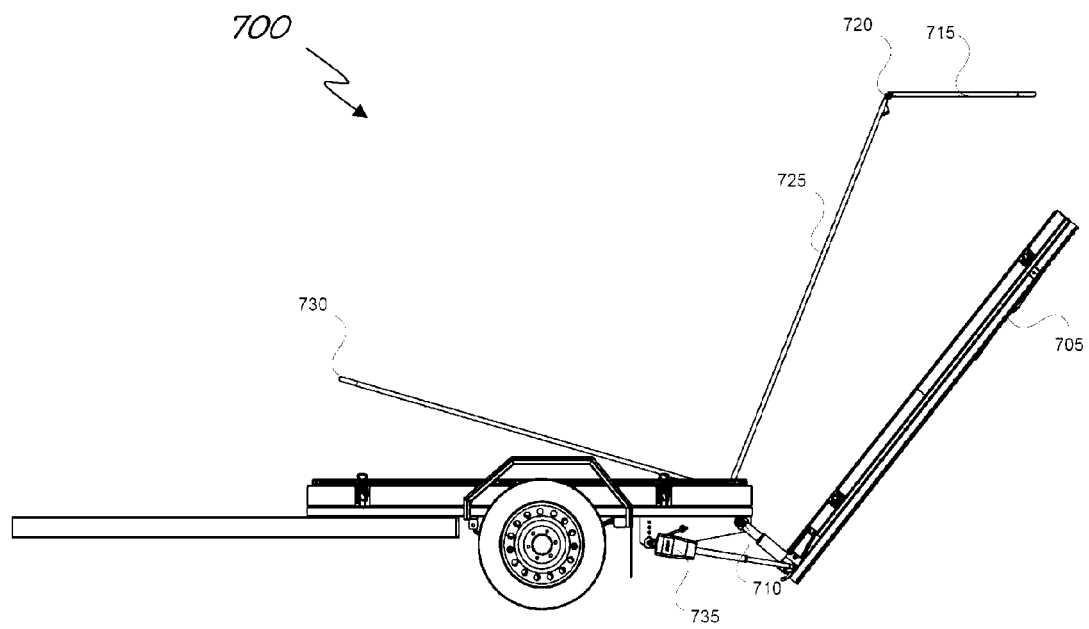
FIG. 7 shows an exemplary tent trailer in the later steps of the deployment phase in accordance with another preferred embodiment of the present invention.
Figure 8:
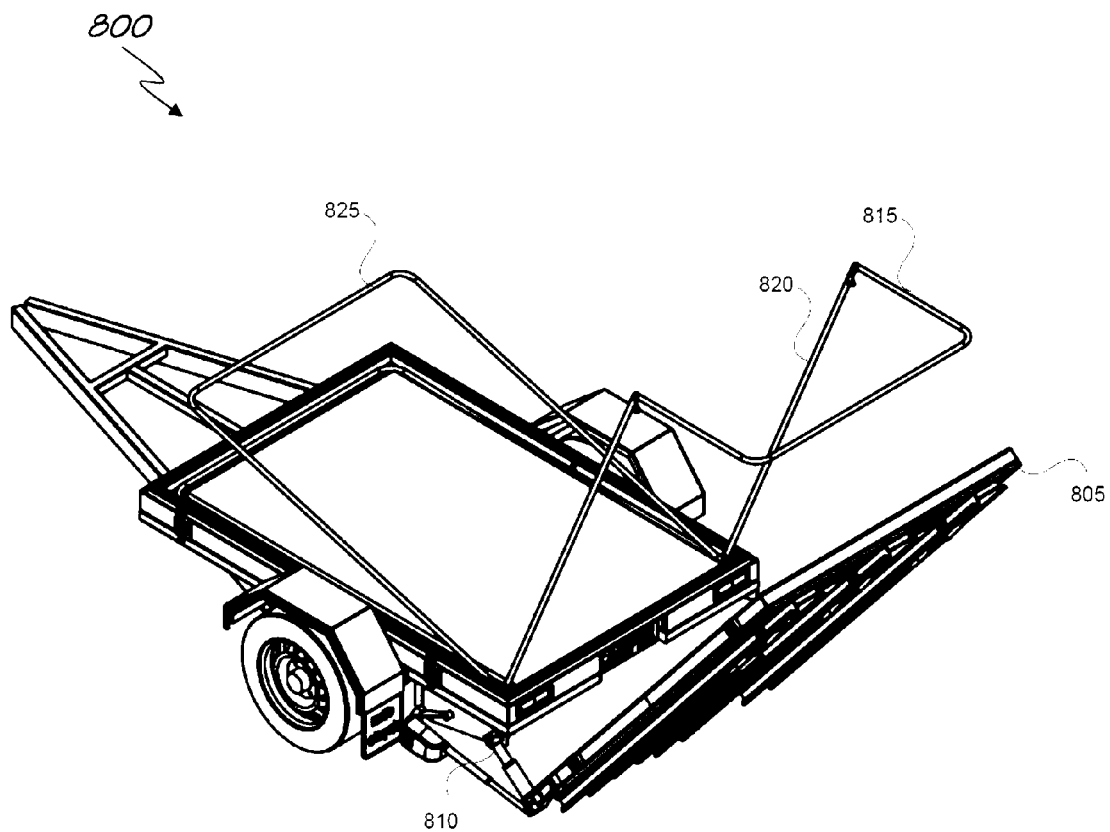
FIG. 8 shows a perspective view of the exemplary tent trailer in the later steps of the deployment phase in accordance with another preferred embodiment of the present invention.

As the tent trailer 700 deploys as shown in FIG. 7, the surface portion 705 further pivot is about the pivot point 710 of the trailer 700, the rotation is supported by torsion member 735, the length of the surface portion 705 from the pivot point 710 is substantially equal to the length from the pivot point 710 to the ground. At the same time, the stowed mechanical members that form tent structural support are being deployed annotated as the mechanical link 720 including the horizontal terminating link 715 hinged against the first portion 725 of the mechanical link 720, and the vertical member 730. The respective embodiment of the trailer 800 in the perspective view is shown in FIG. 8 where the surface portion 805 pivoted against the pivot point 810 opening up the tent supporting members 815, 825 and 825 respectively.

Figure 9:
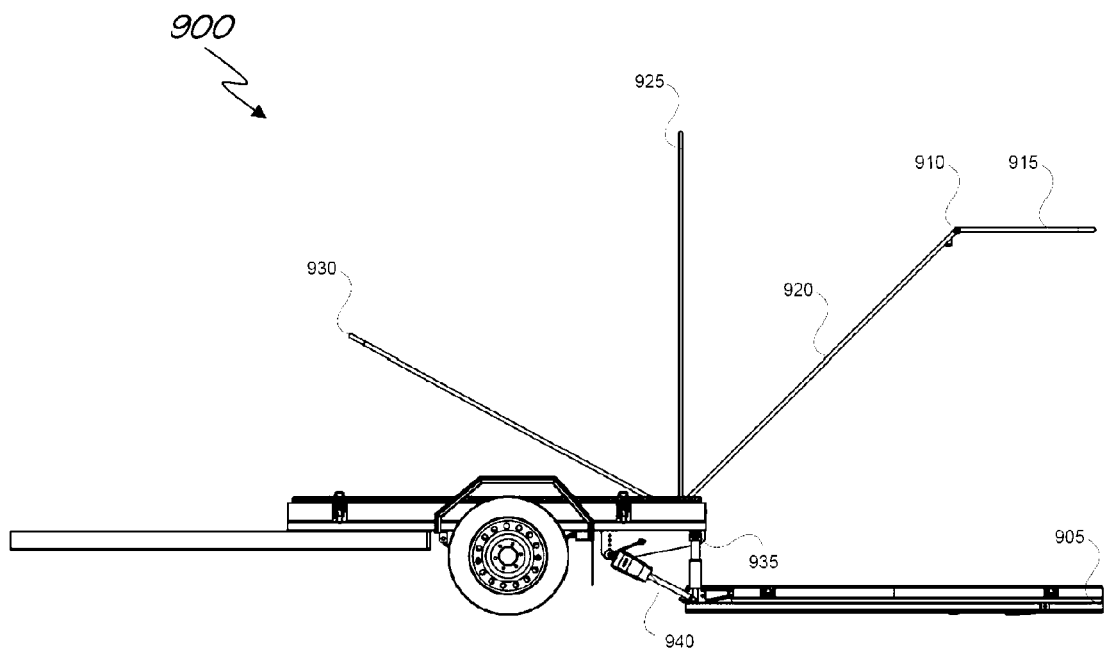
FIG. 9 shows an exemplary tent trailer in the final steps of the deployment phase in accordance with another preferred embodiment of the present invention.
Figure 10:
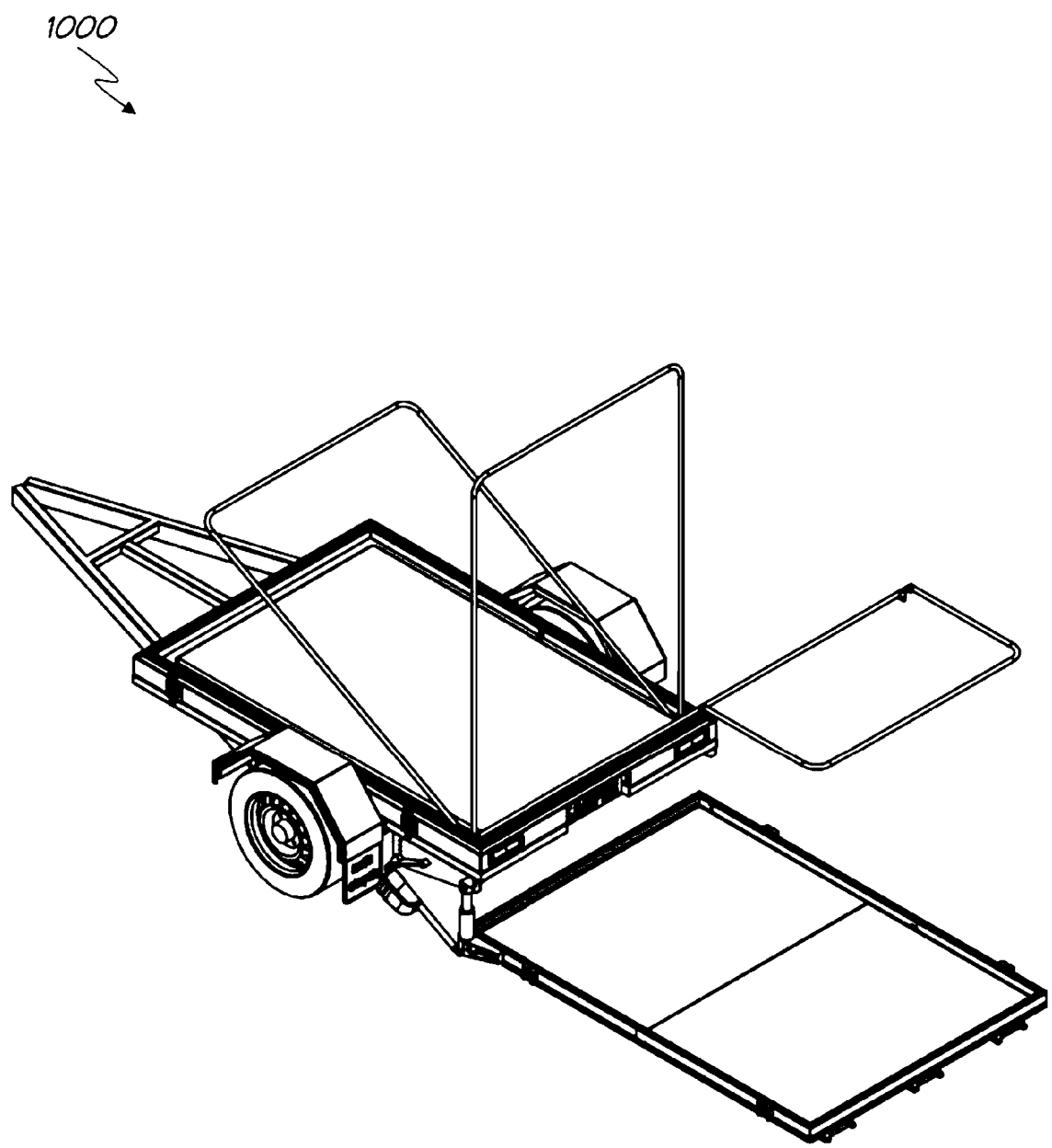
FIG. 10 shows a perspective view of the exemplary tent trailer in the final steps of the deployment phase in accordance with another preferred embodiment of the present invention.

In the final steps of the tent deployment process of the tent trailer 900 as shown in FIG. 9, the surface portion 905, the top portion of the trailer 900 in stowed configuration, has pivoted 180 degrees about the pivot point 935 of the trailer 900 to be adjacent to the ground forming the base of the tent. Here, the height adjuster 945 has been configured by torsion member 940 to the deployed configuration. The length of the torsion member 940 has adjusted from the closed position to the opened position of the surface portion 905 such that sufficient support can be provided. In a particular embodiment, the tent supporting members well attached to the tent are shown in fully deployed configurations. However, for simplicity of illustration, the overlaying tent canvas is not shown. In alternative embodiments, the user may choose to strap on the tent canvas onto the structural members post deployment. The tent supporting members including the mechanical link 910 that is configurable into a deployed configuration where the terminating portion is substantially horizontally disposed. In particular, the terminating portion constitutes a horizontal terminating portion 915 hinged against the first portion 920 of the mechanical link 910 to ensure there is no obstruction across tent doorways or lowering of the doorway. In this particular embodiment, the vertical 925 and inclined links 930 are additional members to erect the tent canvas. While a vertical member and an inclined member have been shown, the tent supporting members can take forms of other configurations necessary for application. The deployed tent trailer 1000 without the tent canvas overlay for the sake of simplicity in illustration is shown in perspective view in FIG. 10.

Height Adjuster

Figure 11:
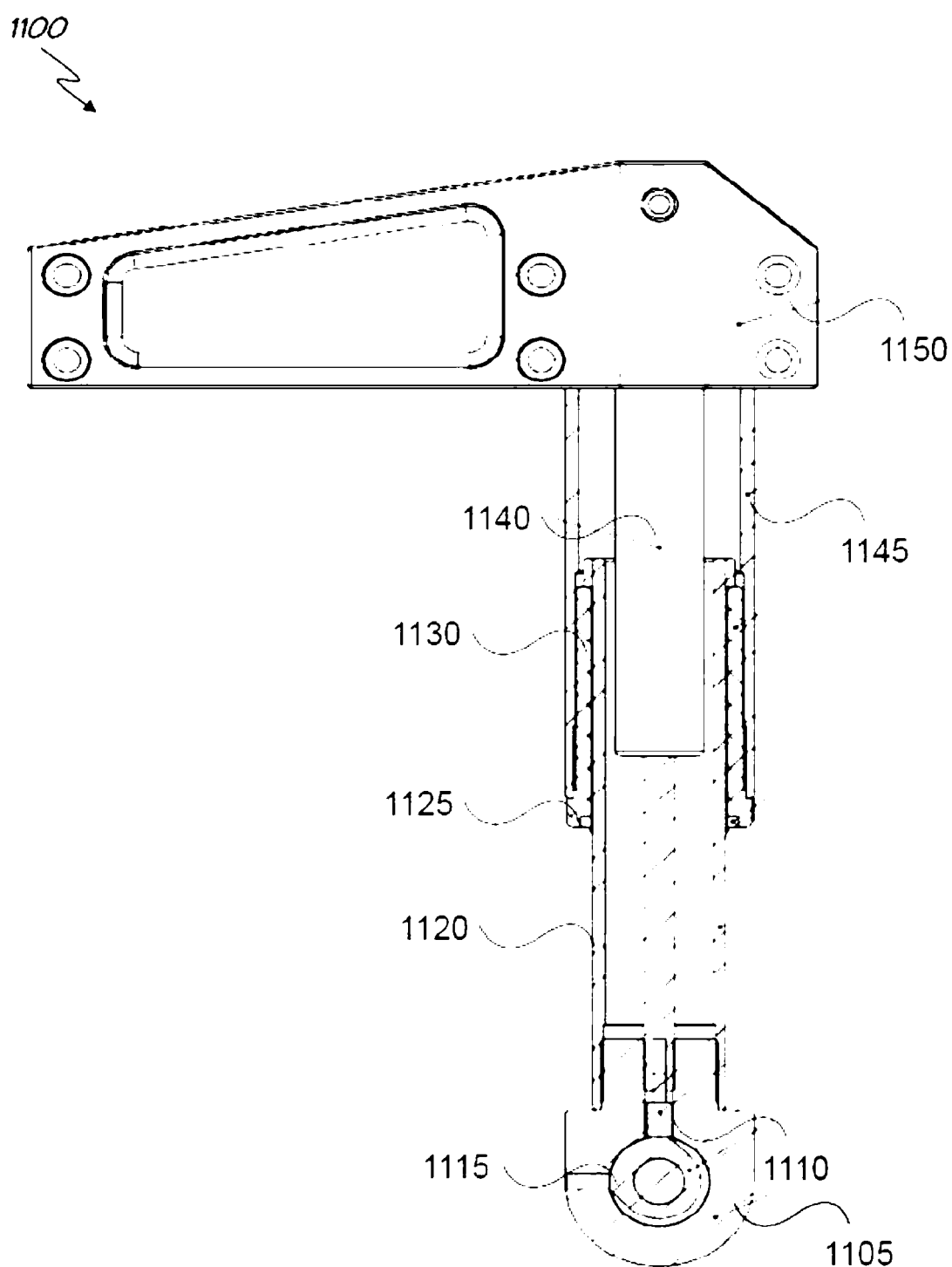
FIG. 11 shows an exemplary height adjuster adaptable with actuating means in accordance with another preferred embodiment of the present invention.

Central to the storage and the deployment of the tent trailer 1000 to be of a suitable height for the transport of objects and light recreational vehicles, is a telescopic height adjuster 1100 shown in FIG. 11. The telescopic height adjuster is retrofittable to tent trailer. The telescopic adjuster 1100 of this particular embodiment is part of the mechanical arrangement for the tent trailer that is used for pivoting the surface portion about the pivot point. One end of the height adjuster 1100 is attached to the side of the surface portion of the tent trailer via a suitable top mount 1150, while the other end is connected to the pivot point 1105 for deployment of the surface portion of the tent trailer. Inside the height adjuster 1100, there is an internal supporting elongated member 1140, otherwise known as a lockable strut, which is extendable along the elongated axis that provides support in the form of increasing the rigidity or tensile strength of the height adjuster 1100.

The telescopic nature of the height adjuster 1100 means that there is an inner guide tube 1120 of a smaller diameter relative to an outer guide tube 1145. The inner guide tube 1120 is configured for linear translation movement relative to the outer guide tube 1145. Vibrations between the outer and inner guide tube is isolated by guide bushings 1130 and the difference in diameter between the guide tube and guide bush can be sealed off with relevant sealing materials or related 1125.

In this particular embodiment, where the deployment and storage configuration of the tent trailer is to be performed automatically, the length of the internal supporting elongated member 1140 may extended by the torsion member, whose linear displacement is controlled by an actuator. Once the maximum height elevation has been achieved with the height adjuster 1100, the rotation of the surface portion about the pivot point 1105 is initiated. During the rotation, a locking plunger 1110 manoeuvers according to the rotation of plunger activation cam 1115 that in turn locks the strut 1140 into position. Therefore, the lockable means is activated by the rotation of the height adjuster 1100 in the extended configuration about the pivot point 1105. The rotation process proceeds until the surface portion has rotated approximately 180° such that the surface portion is in parallel and in close or full contact with the ground and in the final, deployed configuration. Throughout the entire process, the tent canvas gradually deploys together with the internal support members 1500 until the tent is fully erect for use once the surface portion is in the deployed configuration.

The tent collapsing process is simply the chronological reverse of the deployment process where the collapsing of the height adjuster 1100 does not take place until the height adjuster 1100 has rotated to a position where the plunger activation cam 1115 has also rotated to an extent to allow for the linear displacement of the locking plunger 1110. Effectively, the process unlocks the locking mechanism such that the length of the height adjuster 1100 can be altered.

Figure 12:
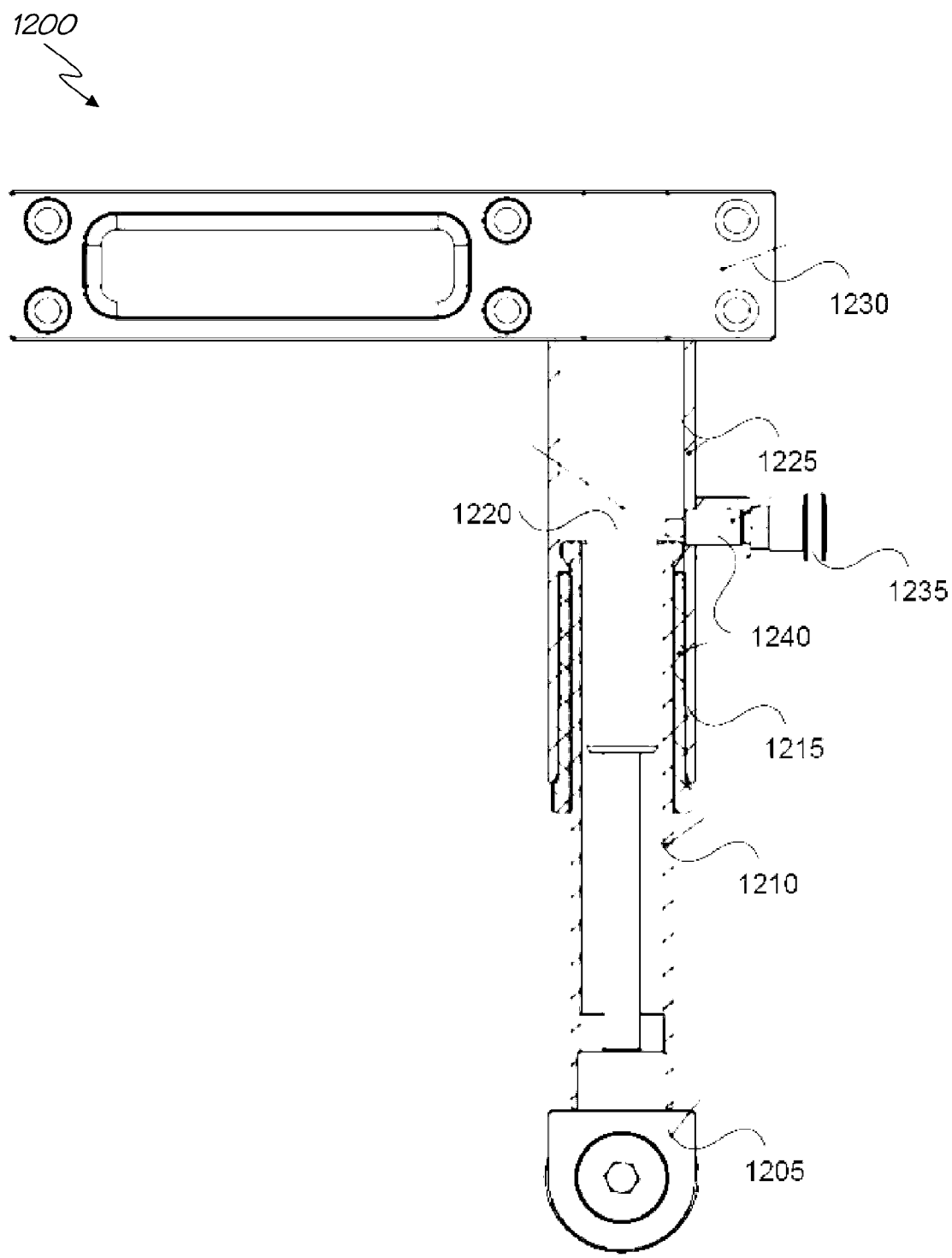
FIG. 12 shows an exemplary height adjuster with user adjustable handle in accordance with another preferred embodiment of the present invention.

In an alternative embodiment, the height adjuster 1200 shown in FIG. 12 can be extended in length along the elongated axis manually by the user. One end of the height adjuster 1200 is connected to the tent trailer via the top mount 1230 while the other end is connected to the pivot point 1205 for the deployment and storage of the surface portion of the tent trailer. The height adjuster 1200 is also telescopic in structure including an inner guide tube 1210 inside an external guide tube 1225, where inside the tubes there is the strut 1220 that is extendable along the elongated axis. To isolate vibrations and reducing friction, guide bushings 1215 are used. The length of the height adjuster 1200 along the elongated axis may be adjusted manually by the user and fixed or locked in by a suitable locket lockable means 1240 that is activated by a user adjustable handle such as a knob 1235.

Figure 13:
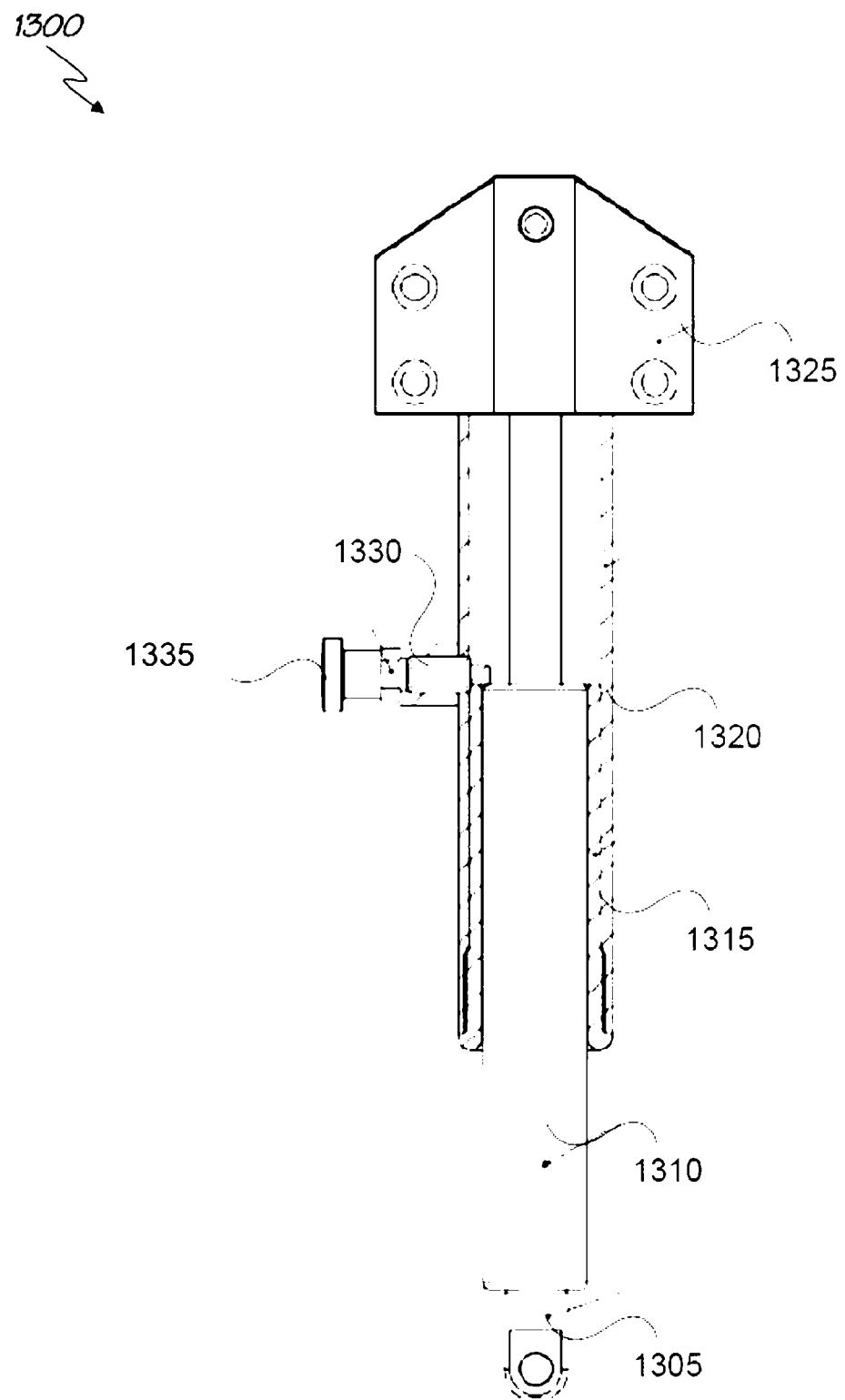
FIG. 13 shows another exemplary height adjuster with user adjustable handle in accordance with another preferred embodiment of the present invention.

In another embodiment, the height adjuster 1300 shown in FIG. 13 is also extendable in length along the elongated axis manually by the user. One end of the height adjuster 1300 is connected to the tent trailer via a top mount 1325, the other end is connected to the pivot point 1305. The different arrangement here effectively has the strut member being the interior guide tube within an outer guide tube 1320 of the telescopic height adjuster 1300 such that extending the length of the height adjuster 1300 means the linear displacement of the strut 1310. To isolate vibrations, guide bushings 1315 are again used. The length of the height adjuster 1300 along the elongated axis may be adjusted manually by the user and fixed or locked in by a suitable locket lockable means 1330 that is activated by a user adjustable knob 1335. In general, the locking mechanisms pertaining to the lockable means 1330 are not limited to spring button locking pins, use of collar snap locks and even appropriate threading on the strut 1310. It can be appreciated by a person skilled in the art that different arrangement, variations and combinations of lockable means 1330, locking device 1330, struts 1310 and mounts 1325 can be used to provide the mechanical arrangement or design suitable for the particular application.

Figure 14:
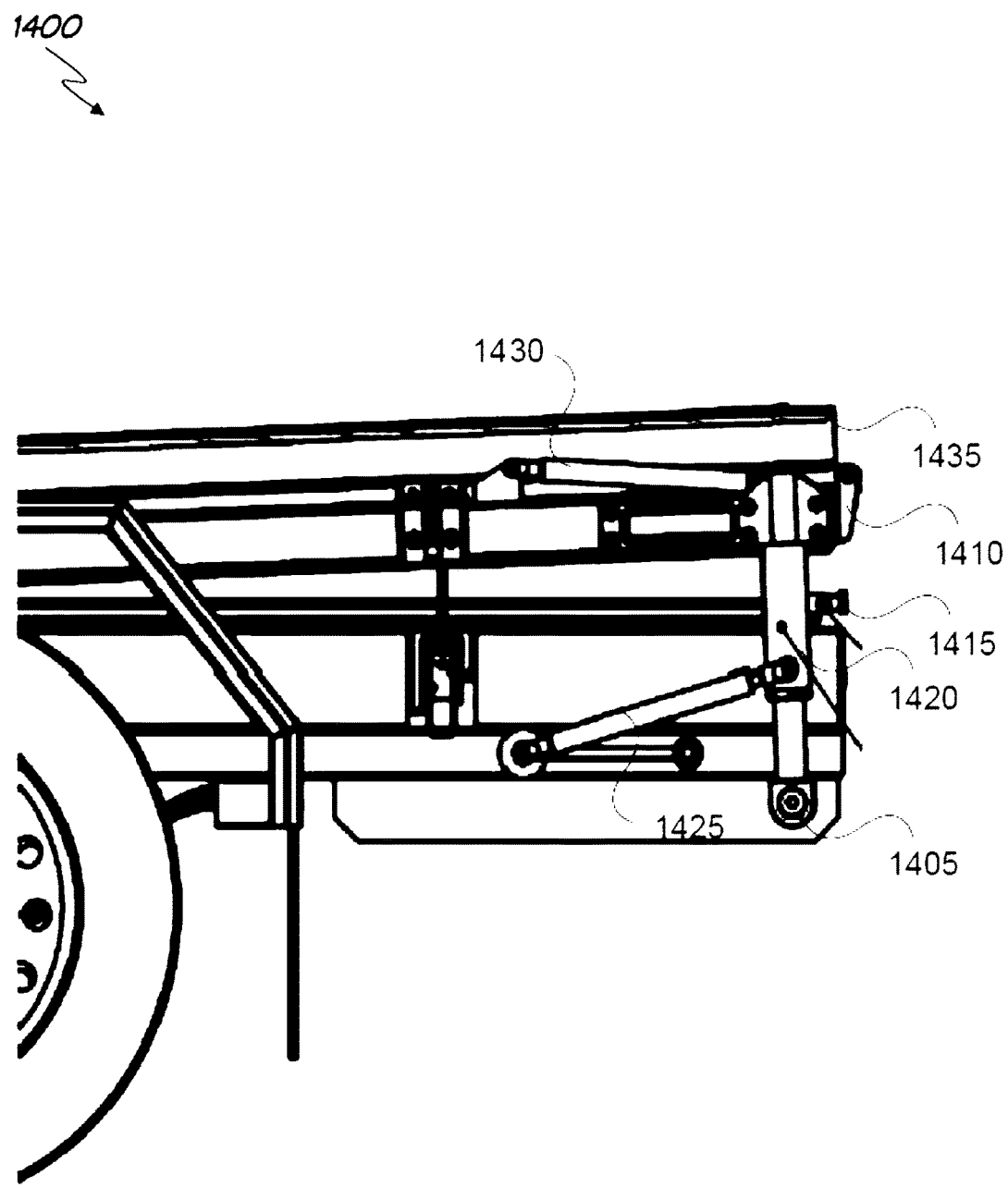
FIG. 14 shows the exemplary mechanical arrangement for the height adjuster with user adjustable handle in accordance with another preferred embodiment of the present invention.

The mechanical arrangement for the alternative embodiments of manual deployment and storage of the tent trailer 1400 is shown in FIG. 14, where the surface portion 1410 has been elevated by the height adjuster 1420 and the length of which is fixed by lockable means as described earlier that can be activated by a knob 1415. The torsion member 1425, much like the torsion member used in the automated height elevation of the surface portion 1410, is also extendible along the elongated axis to provide necessary resistance as the surface portion 1410 pivots about the pivot point 1405. The torsion member 1425 can be adapted at any point along the elongated axis of the height adjuster 1420. To further control the opening or the deployment of the surface portion 1410 of the tent trailer 1400, additional members with extendible length can be used such as a top frame assist strut 1430 to provide the necessary leverage such that the top frame 1435 is deployed first prior to the surface portion 1410. By doing so, safety in the deployment stage is ensured.

Even though the height adjuster 1420 described are supported by internal strut or traction spring. In other embodiments, where the height adjuster 1420 has sufficient tensile strength, internal strut or traction springs may be redundant.

Mechanical Link

Figure 15:
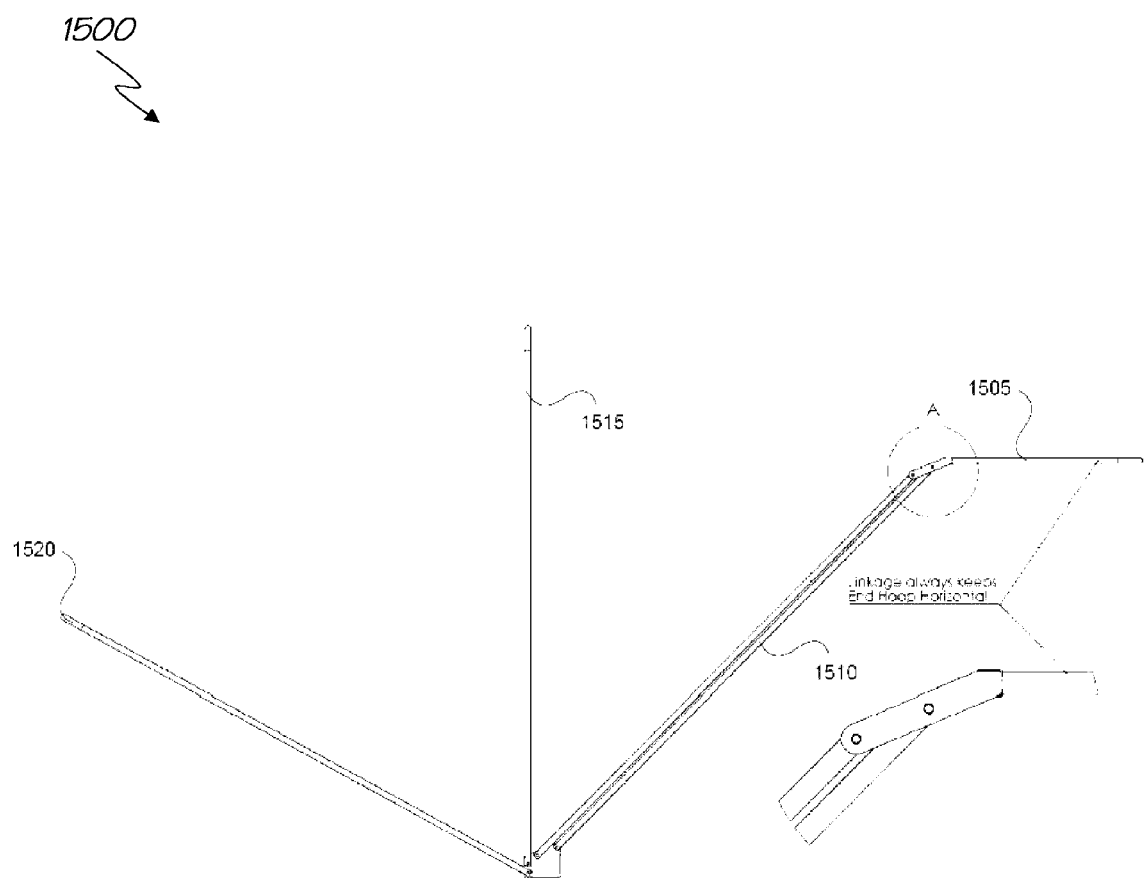
FIG. 15 shows the exemplary mechanical arrangement to provide structural support for the tent in accordance with another preferred embodiment of the present invention.

FIG. 15 shows the mechanical support members 1500 in deployed configuration to provide the necessary structural support for the tent canvas (not shown). In particular, the mechanical link configurable in the storage configuration with the horizontal terminating link 1505 lying substantially parallel to the first portion 1510, can be deployed such that the horizontal terminating link 1505 that is pivoted against the first portion of the mechanical link 1510, it is substantially horizontal. The horizontal terminating link 1505 ensures that there would be a clear and open doorway with no obstructions for the tent canvas covering. The length of the horizontal terminating link 1505 may vary accordingly to the dimensioning of the opening and can be used further to structurally support the canvas vertically or horizontally leading to more usable floor space and weather protection. To keep the horizontal terminating link 1505 substantially horizontal, a simple hinged linkage system that can be spring-loaded is used. Depending on requirements, additional user adjustable straps may be used to securely attach the structural support members 1500 to the covering tent canvas especially in the event of windy weather. Additional structural support such as a vertical member 1515 and the angular support 1520 are used in this particular embodiment. In general, it is understandable that alternative designs or arrangements of the structural support member may be possible in upholding a tent canvas.

Even though the tent canvas is not shown, the mechanical link, in particular the horizontal terminating link 1505 and the first portion of the mechanical link and 510 can be strapped to the tent canvas in all times, that is in deployment and also during storage.

Figure 16:
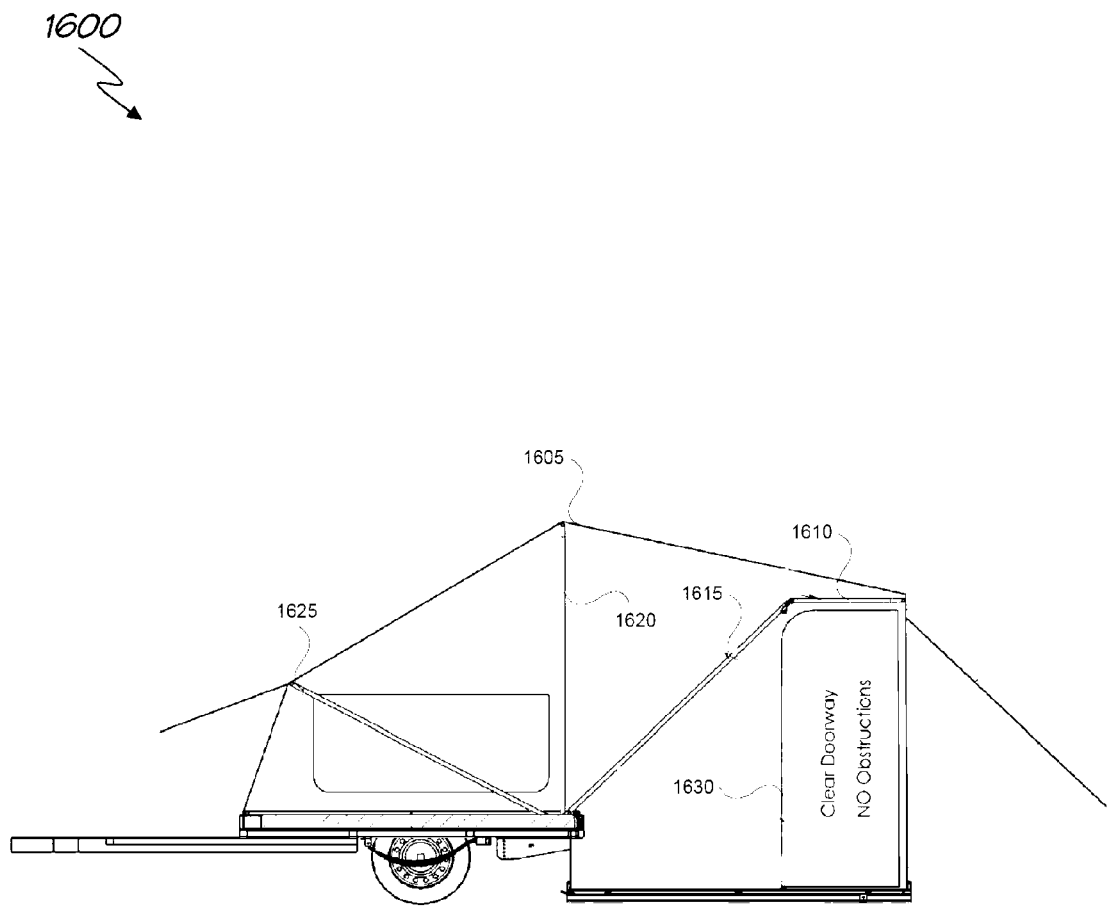
FIG. 16 shows the exemplary mechanical arrangement overlayed by the tent in accordance with another preferred embodiment of the present invention.
Figure 17:
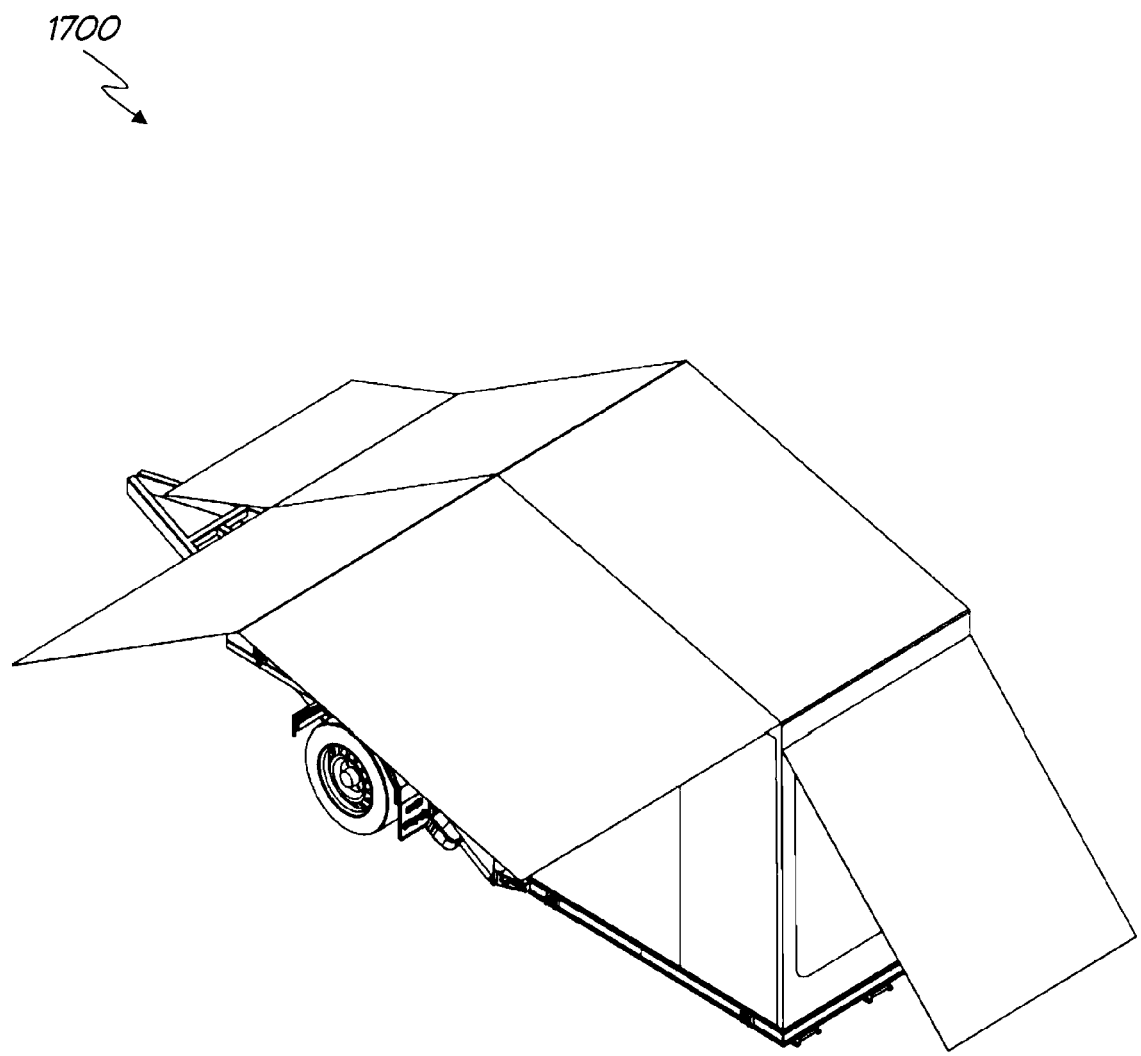
FIG. 17 shows the perspective view of the tent trailer in fully deployed configuration in accordance with another preferred embodiment of the present invention.
Figure 18:
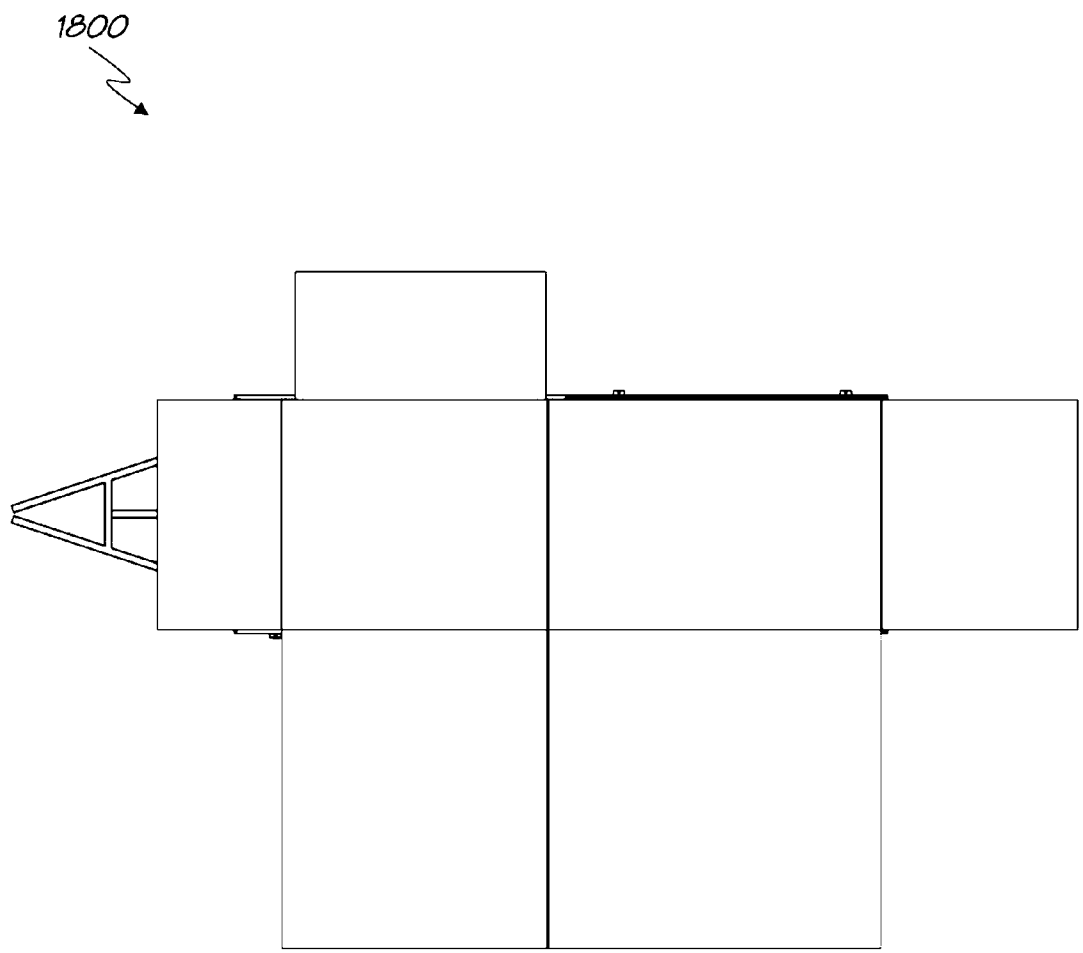
FIG. 18 shows the bird-eye view of the tent trailer in fully deployed configuration in accordance with another preferred embodiment of the present invention.

FIG. 16 shows the tent trailer 1600 with the canvas overlay 1605 and the respective Internal support mechanical members in this particular embodiment. As can be seen, the ability for a mechanical link to be substantially horizontally disposed in the deployed configuration is realised by the horizontal terminating link 1610 allows for clear doorway with no obstructions. The horizontal terminating link 1610 is hinged against the first portion 1615 of the mechanical link and the horizontalness of the horizontal terminating link 1610 is deployed and maintained by elastic straps and cords 1630 otherwise commonly known as bungy. During deployment, the bungy 1630 applies a downward force to pull the mechanical link downward that effectively straighten the link while increasing the overall horizontal distance from the pivot point. Once deployed, further adjustable straps can be used to securely fasten the internal support mechanical members in taut position especially in windy conditions. Additional structural members 1620 and 1625 can be arranged and configured according to the desired spacing or dimensioning requirements of the tent that ultimately is governed by applications and user preferences. The perspective and bird-eye view of the preferred embodiment with the tent fully deployed is shown in FIG. 17 and FIG. 18 respectively to demonstrate the scope of spacing coverage of the tent canvas.

Interpretation

Means For Carrying out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in this particular embodiment" or "in a particular embodiment" or "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details.

In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is Intended to claim all such changes and modifications as fall within the scope of the invention. For example, any formulas given above are merely representative of procedures that may be used. Functionality may be added or deleted from the block diagrams and operations may be Interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the tent trailer industries.

The claims defining the invention are as follows:

1. A mechanical arrangement for a trailer, the mechanical arrangement comprising:
a surface portion for operative attachment to the trailer, the surface portion configurable in (i) a stowed configuration wherein the surface portion is located on top of the trailer and (ii) a deployed configuration wherein the surface portion lies adjacent a ground surface supporting the trailer;
a telescopic height adjuster adapted to attach the surface portion to a pivot point on the trailer, the height adjuster configurable in (i) a retracted stowed position when the surface portion is in the stowed configuration and (ii) a deployed position when the surface portion is located in the deployed configuration; and
a torsion member adapted for operative attachment to the trailer and to the height adjuster, the torsion member adapted to apply a torque to the height adjuster so as to pivot the surface portion about the pivot point thereby to locate the surface portion respectively in the stowed and deployed configuration.

2. A mechanical arrangement as claimed in claim 1, wherein the torsion member has an elongated member extendible along an elongation axis.

3. A mechanical arrangement as claimed in claim 2, comprising actuating means operably coupled to the torsion member, in use the actuating means adapted to effect linear displacement of the elongated member along the elongation axis.

4. A mechanical arrangement as claimed in claim 1, wherein the pivot point is located a distance above the ground surface, the height adjuster adapted to undergo an amount of linear telescopic extension which is substantially equal in magnitude to the distance of the pivot point above the ground surface.

5. A mechanical arrangement as claimed in claim 1, comprising a mechanical support arrangement operatively associated with the surface portion and adapted for operative attachment to a tent.

6. A mechanical arrangement as claimed in claim 5, wherein the mechanical support arrangement comprises a terminating link pivotally attached to a first portion of the mechanical support arrangement, the terminating link having a substantially horizontal deployed configuration.

7. A mechanical arrangement as claimed in claim 6, wherein the terminating link supports a doorway of the tent.

8. A mechanical arrangement as claimed in claim 6, wherein the first portion is hinged to the terminating link via a mechanical link.

9. A mechanical arrangement as claimed in claim 8, including an elastic band adapted to apply an operative downward force to the mechanical link.

10. A mechanical arrangement as claimed in claim 9, wherein the elastic band is part of a bungee assembly.

11. A mechanical arrangement as claimed in claim 8, wherein the mechanical link is spring loaded.

12. A trailer comprising:
a surface portion operatively attached to the trailer, the surface portion configurable in (i) a stowed configuration wherein the surface portion is located on top of the trailer and (ii) a deployed configuration wherein the surface portion lies adjacent a ground surface supporting the trailer;
a telescopic height adjuster attaching the surface portion to a pivot point on the trailer, the height adjuster configurable in (i) a retracted stowed position when the surface portion is in the stowed configuration and (ii) a deployed position when the surface portion is located in the deployed configuration; and
a torsion member attached to the trailer and to the height adjuster, the torsion member adapted to apply a torque to the height adjuster so as to pivot the surface portion about the pivot point, thereby to locate the surface portion respectively in the stowed configuration and the deployed configuration.

13. A trailer as claimed in claim 12, comprising a mechanical support arrangement operatively associated with the surface portion and adapted for operative attachment to a tent.

14. A trailer as claimed in claim 13, wherein the mechanical support arrangement comprises a terminating link pivotally attached to a first portion of the mechanical support arrangement, the terminating link having a substantially horizontal deployed configuration.

15. A trailer as claimed in claim 14, wherein the terminating link supports a doorway of the tent.

16. A trailer as claimed in claim 14, wherein the first portion is hinged to the terminating link via a mechanical link.

17. A trailer as claimed in claim 16, including an elastic band adapted to apply an operative downward force on the mechanical link.

18. A trailer as claimed in claim 17, wherein the elastic band is part of a bungee assembly.

19. A trailer as claimed in claim 16, wherein the mechanical link is spring loaded.

20. A trailer as claimed in claim 12, wherein the pivot point is located a distance above the ground surface, the height adjuster adapted to undergo an amount of linear telescopic extension which is substantially equal in magnitude to the distance of the pivot point above the ground surface.

* * * * *